(12) United States Patent
Sonoda et al.

(10) Patent No.: US 9,929,683 B2
(45) Date of Patent: Mar. 27, 2018

(54) MOTOR DRIVE DEVICE AND BRUSHLESS MOTOR

(71) Applicant: Panasonic Intellectual Property Management Co., Ltd., Osaka (JP)

(72) Inventors: Daisuke Sonoda, Osaka (JP); Mitsuhiro Sakamoto, Osaka (JP); Toru Tazawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/328,149

(22) PCT Filed: Aug. 28, 2015

(86) PCT No.: PCT/JP2015/004337
§ 371 (c)(1),
(2) Date: Jan. 23, 2017

(87) PCT Pub. No.: WO2016/035298
PCT Pub. Date: Mar. 10, 2016

(65) Prior Publication Data
US 2017/0214343 A1    Jul. 27, 2017

(30) Foreign Application Priority Data
Sep. 5, 2014 (JP) .................. 2014-180895

(51) Int. Cl.
*H02P 6/04* (2016.01)
*H02P 6/18* (2016.01)
(Continued)

(52) U.S. Cl.
CPC ............... *H02P 6/18* (2013.01); *H02P 21/24* (2016.02); *H02P 27/06* (2013.01)

(58) Field of Classification Search
CPC ........ H02P 21/14; H02P 21/141; H02P 21/18; H02P 21/24; H02P 21/26
See application file for complete search history.

(56) References Cited

U.S. PATENT DOCUMENTS

2007/0024232 A1* 2/2007 Suzuki ................ H02P 6/20
318/812

FOREIGN PATENT DOCUMENTS

JP    2004-015858    1/2004
JP    2010-029016    2/2010
(Continued)

OTHER PUBLICATIONS

Translation of JP2010206874 has been attached.*
(Continued)

*Primary Examiner* — Shawki S Ismail
*Assistant Examiner* — Zoheb Imtiaz
(74) *Attorney, Agent, or Firm* — McDermott Will & Emery LLP

(57) ABSTRACT

Provided is a motor drive device which performs switching, with respect to a synchronous motor including a stator around which a motor winding is wound and a rotor holding a permanent magnet, from a synchronous operation in which the synchronous motor is synchronously driven to position-sensorless vector control in which a current supplied to the motor winding is controlled based on a position of the rotor. During the synchronous operation, the present motor drive device calculates, by estimation, an induced voltage error based on the detected current and voltage, performs control of an amplitude of a current instruction such that an error, of a target induced voltage, calculated based on an estimated induced voltage and based on an internal angle becomes equal to the induced voltage error, and switches the mode to the sensorless mode after the error is reduced to be within a (Continued)

range of a predetermined value. Further, by gradually reducing the current instruction during the synchronous operation, the absolute value of the induced voltage error is reduced to be within a range of the predetermined value.

3 Claims, 4 Drawing Sheets

(51) Int. Cl.
*H02P 21/24* (2016.01)
*H02P 27/06* (2006.01)

(56) References Cited

FOREIGN PATENT DOCUMENTS

| JP | 2010-206874 | | 9/2010 |
|----|-------------|---|--------|
| JP | 2010206874 | * | 9/2010 |
| JP | 2011-131643 | | 7/2011 |
| JP | 2011131643 | * | 7/2011 |

OTHER PUBLICATIONS

Translation of JP2011131643 has been attached.*
International Search Report of PCT application No. PCT/JP2015/004337 dated Nov. 10, 2015.

* cited by examiner

MOTOR DRIVE DEVICE AND BRUSHLESS MOTOR

This application is a U.S. national stage application of the PCT international application No. PCT/JP2015/004337 filed on Aug. 28, 2015, which claims the benefit of foreign priority of Japanese patent application No. 2014-180895 filed on Sep. 5, 2014, the contents all of which are incorporated herein by reference.

TECHNICAL FIELD

The present invention relates to a motor drive device which drives a synchronous motor in which a rotor holds a permanent magnet and relates to a brushless motor including the synchronous motor.

BACKGROUND ART

As a method for controlling torque of such a synchronous motor at a high speed and with a high accuracy, there is known a vector control method in which a current of a synchronous motor is controlled based on a rotating coordinate system synchronized with a position of a rotor detected by a position sensor. The position sensor has problems such as that a mounting space and cost are increased and that a use environment of the motor is limited by a use environment of the position sensor.

As one measure to solve these problems, a position-sensorless vector control method is in practical use, in which rotor position information is estimated based on an induced voltage of the motor calculated from a current and a voltage of the motor and a motor constant such as a winding wire resistance.

Further, because the induced voltage is proportional to a rotation speed of the motor, when the motor speed is low, for example, at a time of start-up, the induced voltage is excessively low, thus an estimation accuracy of the rotor position is low. Therefore, there is known a method in which a synchronous operation is performed at the time of starting the motor and in which the operation is shifted to position-sensorless vector control when the rotation speed increases to an appropriate speed. Specifically, in this method, a synchronous operation mode is used to perform a synchronous operation at the time of start-up of the motor with a predetermined current being supplied to the motor winding, and a frequency of the current is gradually increased so that the motor is accordingly accelerated. Then, after the motor is accelerated to a predetermined rotation speed at which the position of the rotor can be estimated, the mode is switched to a position-sensorless vector control mode.

However, in this method using the two modes, a change occurs in a phase of the current flowing through a motor winding when the mode is switched to the position-sensorless vector control mode, and the change in the phase causes vibration, noise, and a rapid acceleration of the motor.

Therefore, as a technology to address these issues, a method of PTL 1 is conventionally proposed, for example. In PTL 1, an axial error is first estimated without using a sensor during a synchronous operation, and feedback control is performed such that a phase difference between the estimated axial error and a current instruction value becomes identical. Next, after the estimated axial error is reduced to within a predetermined range, the operation is switched from the synchronous operation to sensorless control. After that, the phase is gradually changed to a current phase of position-sensorless vector control.

However, in the conventional method in PTL 1, because the phase is gradually changed to the current phase of the position-sensorless vector control after the operation is switched from the synchronous operation to the position-sensorless vector control, it takes time to shift to the perfect position-sensorless vector control.

CITATION LIST

Patent Literature

PTL 1: Unexamined Japanese Patent Publication No. 2010-29016

SUMMARY

A motor drive device of the present invention performs switching, with respect to a synchronous motor including a stator around which a motor winding is wound and a rotor holding a permanent magnet, from a synchronous operation in which the synchronous motor is synchronously driven to position-sensorless vector control in which a current supplied to the motor winding is controlled based on a position of the rotor. During the synchronous operation, the motor drive device calculates an induced voltage error based on a detected current and voltage, reduces an absolute value of the induced voltage error to be within a range of a predetermined value, and then switches from the synchronous operation to the position-sensorless vector control.

Further, a brushless motor of the present invention includes the motor drive device.

With this arrangement, it is possible to switch from the synchronous operation to the position-sensorless vector control at a high speed and to thus reduce a time from the start-up of the motor to reaching a target instruction. As described above, the present invention provides a motor drive device and a brushless motor in which it is possible to shift from the synchronous operation to the position-sensorless vector control at a high speed.

DESCRIPTION OF PREFERRED EMBODIMENTS

Hereinafter, an exemplary embodiment of the present invention will be described with reference to the drawings. Note that the present exemplary embodiment does not limit the present invention.

Exemplary Embodiment

Figure 1:
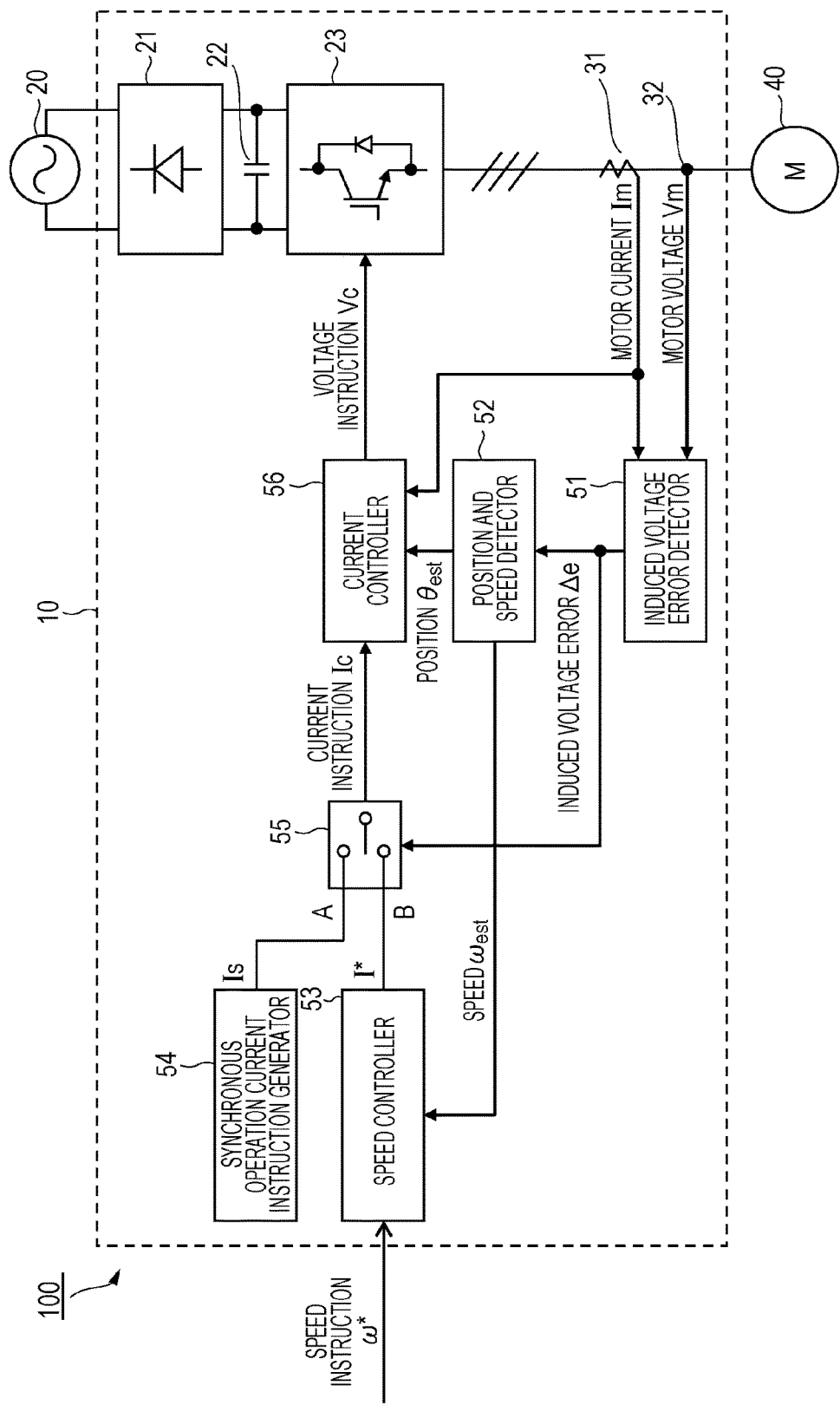
FIG. 1 is a block diagram of a brushless motor including a motor drive device in an exemplary embodiment of the present invention.

FIG. 1 is a block diagram of brushless motor 100 including motor drive device 10 in an exemplary embodiment of the present invention.

As shown in FIG. 1, brushless motor 100 of the present exemplary embodiment has a configuration including motor drive device 10 and synchronous motor 40, and motor drive device 10 energizes and drives synchronous motor 40, so that synchronous motor 40 rotationally operates.

In FIG. 1, motor drive device 10 converts AC power source 20 into a DC voltage by rectifier circuit 21 and smooths the DC voltage through smoothing capacitor 22, and the DC voltage is then supplied to three-phase inverter 23 included in motor drive device 10. Three-phase inverter 23 converts the DC voltage into an arbitrary AC voltage, and the converted AC voltage is supplied to synchronous motor 40 including a permanent magnet. In the present exemplary embodiment, synchronous motor 40 is driven by three phases of U phase, V phase, and W phase which have 120 degree phase differences from each other.

Figure 2:
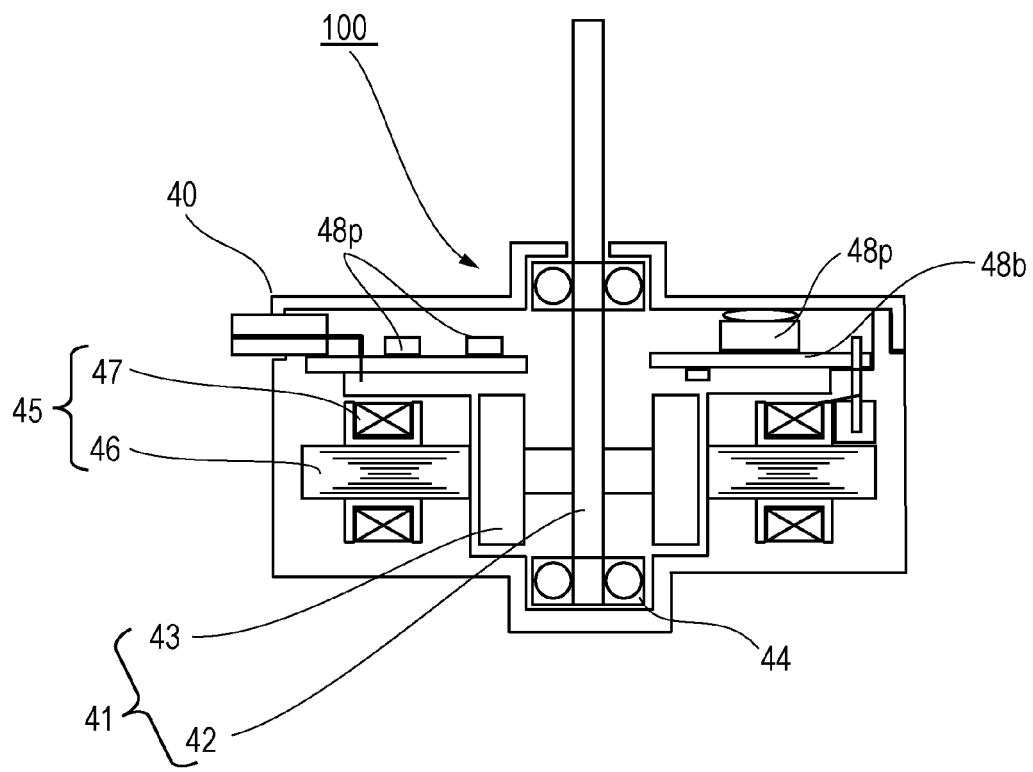
FIG. 2 is a diagram showing a configuration example of a synchronous motor of the motor drive device.

FIG. 2 is a diagram showing a configuration example of synchronous motor 40 in the present exemplary embodiment. As shown in FIG. 2, synchronous motor 40 includes rotor 41 and stator 45. Rotor 41 holds permanent magnet 43 centering shaft 42. Stator 45 is configured with motor winding 47 wound around stator core 46.

Further, in the present exemplary embodiment, brushless motor 100 is configured such that circuit components 48p which function as motor drive device 10 are incorporated in synchronous motor 40. Circuit components 48p are mounted on circuit board 48b, and switching elements constituting inverter 23 are mounted on circuit board 48b, for example. In such a configuration, the AC voltage from inverter 23 is applied to motor winding 47 to energize and drive motor winding 47, so that rotor 41 rotates being rotatably held on bearing 44.

In order to control rotation of such rotor 41, in the present exemplary embodiment, motor drive device 10 includes, in addition to the above inverter 23, induced voltage error detector 51, position and speed detector 52, speed controller 53, synchronous operation current instruction generator 54, and switcher 55. Further, motor drive device 10 is informed of a speed instruction ω* for controlling the rotation speed, as an instruction for controlling rotation of synchronous motor 40 from, for example, an externally provided controller or the like.

Induced voltage error detector 51 is input with a motor current Im detected by current detector 31 and a motor voltage Vm detected by voltage detector 32. Then, induced voltage error detector 51 calculates an induced voltage error Δe based on the input motor current Im and motor voltage Vm and a previously measured motor constant, and outputs the induced voltage error Δe to position and speed detector 52 and switcher 55. Note that a description will be given on how to calculate, later.

Position and speed detector 52 is input with the induced voltage error Δe, calculates an estimated position θest and an estimated speed ωest of the motor, and outputs the estimated position θest to current controller 56 and the estimated speed ωest to speed controller 53. Note that a description will be given on how to calculate, later.

During the position-sensorless vector control, speed controller 53 receives the speed instruction ω*, which is a speed instructed from outside, and outputs to switcher 55 a current instruction I* with which the deviation between the estimated speed ωest and speed instruction ω* becomes zero.

Synchronous operation current instruction generator 54 outputs to switcher 55 a current instruction Is to be used during the synchronous operation.

During the synchronous operation at the time of start-up of motor, switcher 55 selects the current instruction Is from synchronous operation current instruction generator 54 and outputs the current instruction Is to current controller 56 as a current instruction Ic. That is, during the synchronous operation, current controller 56 drives inverter 23 such that inverter 23 supplies to motor winding 47 a current having a predetermined amplitude according to the current instruction Is and that an output frequency of inverter 23 gradually increases. After that, when the absolute value of the induced voltage error Δe becomes equal to or smaller than a predetermined threshold, switching is made to select the current instruction I* from speed controller 53 and to output the current instruction I* to current controller 56 as the current instruction Ic. By this operation, the operation of synchronous motor 40 is switched from the synchronous operation to the position-sensorless vector control.

Current controller 56 calculates a voltage instruction Vc from the current instruction Ic from switcher 55, the motor current Im detected by current detector 31, and the estimated position θest of synchronous motor 40 calculated by position and speed detector 52, and outputs the calculated voltage instruction Vc to three-phase inverter 23.

Next, a further detailed description will be given on a configuration and operation of induced voltage error detector 51 and position and speed detector 52.

First, as is well known in vector control of a motor, as d-q axes, an axis in a magnetic flux direction of permanent magnet 43 of rotor 41 is defined as d-axis, and an axis whose phase advances in a rotational direction from d-axis by 90 degrees is defined as q-axis. Then, a voltage equation of synchronous motor 40 is expressed by the following Equation (1), where a d-axis voltage is vd, a q-axis voltage is vq, a d-axis current is id, a q-axis current is iq, a phase resistance of motor winding 47 is r, a d-axis inductance of motor winding 47 is Ld, a q-axis inductance is Lq, an induced voltage constant of synchronous motor 40 is Ke, and the motor speed is ω.

[Mathematical Expression 1]

$$v_d = ri_d - \omega L_q i_q$$

$$v_q = ri_q + \omega L_d i_d + K_e \omega \quad (1)$$

Figure 3:
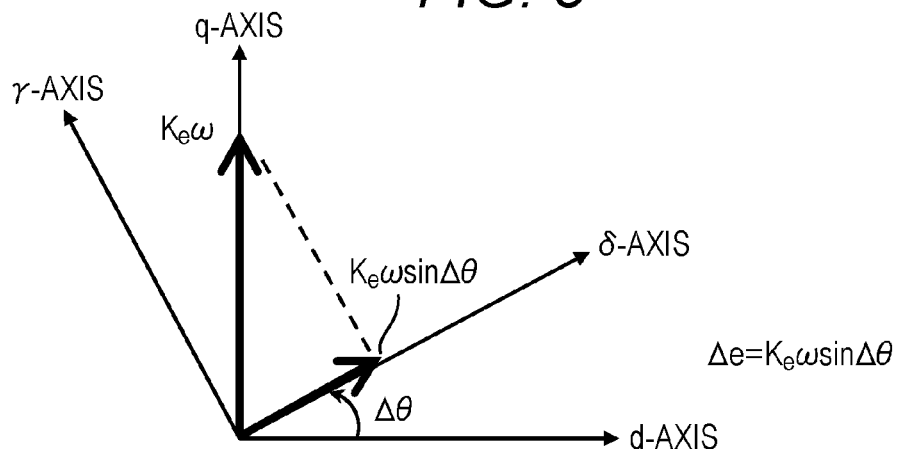
FIG. 3 is a diagram for describing how to calculate an induced voltage error of the motor drive device.

FIG. 3 is a diagram for describing how to calculate the induced voltage error Δe. In FIG. 3, δ-axis is defined by d-axis estimated based on the estimated position θest of synchronous motor 40 calculated by position and speed detector 52, and γ-axis is defined by an axis whose phase advances in the rotational direction from δ-axis by 90 degrees. That is, while d-q axes are orthogonal coordinate axes of a real motor, the δ-γ axes are orthogonal coordinate axes of an estimation control system. Further, an angle difference of the δ-γ axis coordinate with respect to the d-q axis coordinate is the following positional error (axial error) Δθ, and a voltage difference of the induced voltage on the δ-γ axis coordinate with respect to the induced voltage on the d-q axis coordinate is the following induced voltage error Δe. In other words, as shown in FIG. 3, a component of an induced voltage Keω resolved in the δ-axis direction can be said to be the induced voltage error Δe. Here, the induced voltage error Δe is expressed by the following Equation (2) and Equation (3), where the voltage on δ-axis is vδ, the voltage on γ-axis is vγ, and the positional error is Δθ.

[Mathematical Expression 2]

$$\Delta e = v_\delta - ri_\delta + \omega L_q i_\gamma \quad (2)$$

[Mathematical Expression 3]

$$\Delta e = K_e \omega \sin \Delta \theta \quad (3)$$

The induced voltage error Δe and the positional error Δθ are in a proportional relationship. Induced voltage error detector 51 calculates induced voltage error Δe from Equation (2). Then, position and speed detector 52 calculates the estimated speed ωest of the motor from Equation (4) by performing feedback control such that induced voltage error Δe becomes zero. Note that Kp is a proportional gain, and Ki is an integral gain.

[Mathematical Expression 4]

$$\omega_{est} = K_p \Delta e + K_i \int \Delta e \, dt \quad (4)$$

Further, position and speed detector 52 calculates the estimated position θest of rotor 41 by integrating the motor speed ω. If the motor speed ω is small, the calculated induced voltage error Δe is also small, so that a calculation accuracy of the estimated position θest is accordingly low.

To address this issue, when synchronous motor 40 is started, the current instruction Is output from synchronous operation current instruction generator 54 is supplied to speed controller 53 via switcher 55. In this operation, the current instruction Is is output as such a value that the rotation speed is forced to increase with a predetermined acceleration. In this way, the synchronous operation is performed in which a predetermined current is being supplied to motor winding 47 and the frequency of the current is gradually increased to accelerate synchronous motor 40. After that, the control is switched to the position-sensorless vector control.

Figure 4:
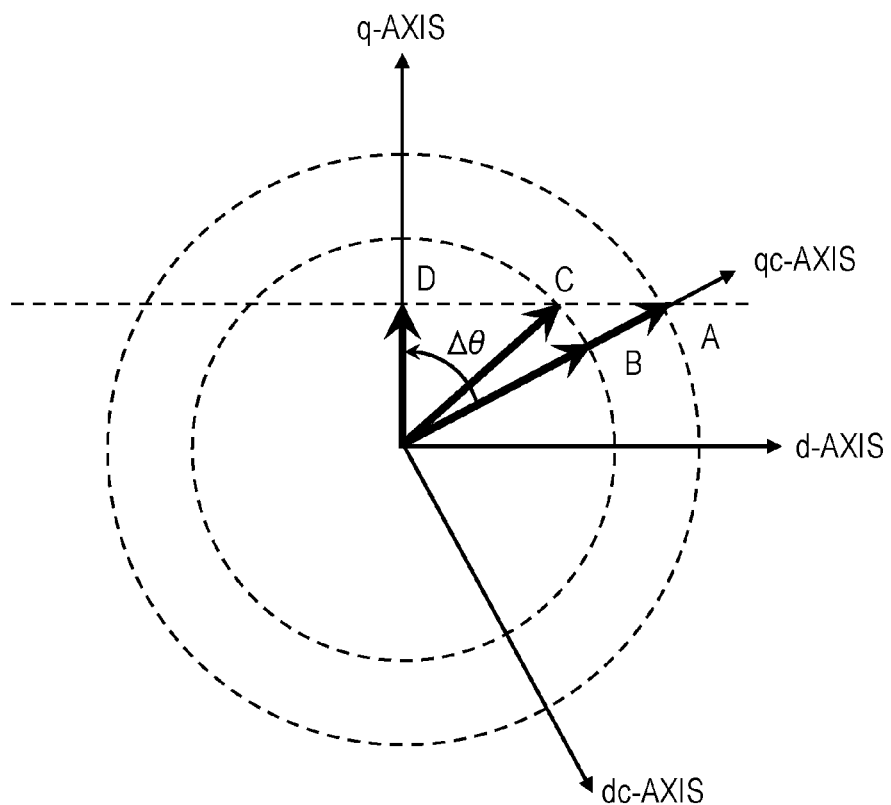
FIG. 4 is a current vector diagram of d-axis, q-axis, dc-axis, and qc-axis during a synchronous operation of the motor drive device.

Next, a description will be given on switching from the synchronous operation to the position-sensorless vector control. FIG. 4 is a current vector diagram of d-axis, q-axis, dc-axis, and qc-axis during the synchronous operation. Control axes of d-axis and q-axis when the motor is being synchronously operated with a current having a predetermined amplitude and a predetermined frequency being supplied to synchronous motor 40 are dc-axis and qc-axis, respectively.

Here, consideration is given to a case that the positional error between d-axis and dc-axis is Δθ and that a current having a magnitude of |A| is being supplied to qc-axis. Assuming a case that the magnitude of the current is reduced from |A| to |B|, because a magnet torque generated by permanent magnet 43 is determined only by the q-axis current, qc-axis moves to point C at which the q-axis current is the same as when the current |A| was supplied.

In a similar way, when the magnitude of the current is gradually reduced, qc-axis is accordingly getting closer to q-axis, and thus the positional error Δθ is getting smaller. Because the positional error Δθ and the induced voltage error Δe are in a proportional relationship, the induced voltage error Δe becomes zero when the positional error Δθ becomes zero.

Figure 5:
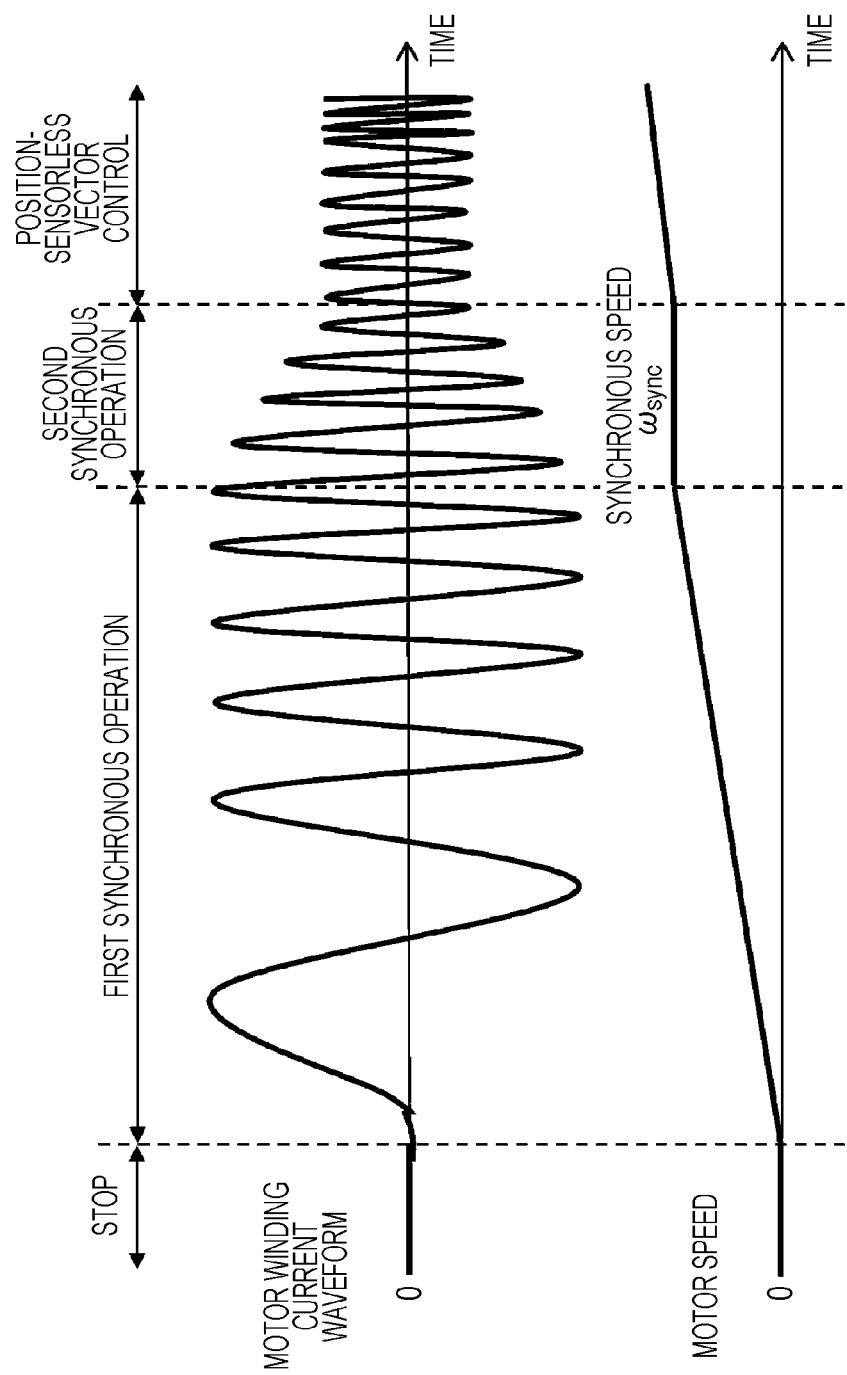
FIG. 5 is a timing chart showing a motor winding current waveform and a motor speed of the motor drive device when the motor is started.

FIG. 5 is a timing chart showing a motor winding current waveform and a motor speed when the motor is started. A current having a predetermined amplitude is started to be supplied to motor winding 47 when synchronous motor 40 is stopped, and the frequency (that is, the rotation speed) of the current is gradually increased, so that the motor speed is accelerated to the synchronous speed ωsync (first synchronous operation of FIG. 5).

Next, the amplitude of the current supplied to motor winding 47 is being reduced, and when the absolute value |Δe| of the calculated induced voltage error Δe becomes equal to or smaller than the predetermined threshold (second synchronous operation of FIG. 5), the control is switched from the synchronous operation to the position-sensorless vector control. In this operation, if the threshold is sufficiently small, the control axis dc and d-axis at the time of switching become the same as described with reference to FIG. 4, and continuity of the current phase at the time of switching is maintained.

As described above, in the present exemplary embodiment, during the synchronous operation, the induced voltage error is calculated by estimation based on the detected current and voltage, and an amplitude of the current instruction is controlled such that an error, of a target induced voltage, calculated based on an estimated induced voltage and based on an internal angle becomes equal to the induced voltage error, and after the error is reduced to be within a range of a predetermined value, the mode is switched to the sensorless mode.

Therefore, it is possible to switch the operation to the position-sensorless vector control without generation of vibration and noise or a rapid acceleration of the motor. Because there is no need for a process, which is used in a conventional art, of gradually switching to the current phase of the position-sensorless vector control after switching, it is possible to quickly switch to the position-sensorless vector control.

INDUSTRIAL APPLICABILITY

As described above, the present invention enables switching from the synchronous operation to the position-sensorless vector control at a high speed and can be used for general motor drive devices driven by the position-sensorless vector control.

The invention claimed is:

1. A motor drive device which performs switching, with respect to a synchronous motor including a stator around which a motor winding is wound and a rotor holding a permanent magnet, from a synchronous operation in which the synchronous motor is synchronously driven to position-sensorless vector control in which current supplied to the motor winding is controlled based on a position of the rotor, wherein, current having a predetermined amplitude is started to be supplied to the motor winding when the synchronous motor is stopped, frequency of the current is gradually increased, so that motor speed is accelerated to a predetermined synchronous speed, and the frequency of the current is maintained constant so that the predetermined synchronous speed is maintained, and wherein the motor drive device calculates an induced voltage error based on a detected current and voltage, reduces an absolute value of the induced voltage error to within a predetermined value, and then switches from the synchronous operation to the position-sensorless vector control.

2. The motor drive device according to claim 1, wherein the absolute value of the induced voltage error is reduced to within a predetermined value by gradually reducing a current instruction of the current flowing in the motor winding during the predetermined synchronous speed operation.

3. A brushless motor comprising the motor drive device according to claim 1.

* * * * *